(12) United States Patent
Wang et al.

(10) Patent No.: US 12,462,134 B2
(45) Date of Patent: Nov. 4, 2025

(54) ELECTRONIC SHELF LABEL

(71) Applicant: Hanshow Technology Co., Ltd., Jiaxing (CN)

(72) Inventors: Linjiang Wang, Zhejiang (CN); Hongbo Shen, Zhejiang (CN); Ming Yang, Zhejiang (CN); Jianguo Zhao, Zhejiang (CN); Yunliang Feng, Zhejiang (CN); Shiguo Hou, Zhejiang (CN)

(73) Assignee: Hanshow Technology Co., Ltd., Jiaxing (CN)

( * ) Notice: Subject to any disclaimer, the term of this patent is extended or adjusted under 35 U.S.C. 154(b) by 0 days.

(21) Appl. No.: 18/575,036

(22) PCT Filed: Jul. 5, 2021

(86) PCT No.: PCT/CN2021/104451
§ 371 (c)(1),
(2) Date: Dec. 28, 2023

(87) PCT Pub. No.: WO2023/279229
PCT Pub. Date: Jan. 12, 2023

(65) Prior Publication Data
US 2024/0354542 A1    Oct. 24, 2024

(51) Int. Cl.
*G06K 19/07* (2006.01)
*G06K 19/077* (2006.01)
(Continued)

(52) U.S. Cl.
CPC ... *G06K 19/0704* (2013.01); *G06K 19/07707* (2013.01); *G09F 3/204* (2013.01);
(Continued)

(58) Field of Classification Search
CPC ......... G06K 19/0704; G06K 19/07707; G06K 19/0706; G06K 19/077; G09F 3/204;
(Continued)

(56) References Cited

U.S. PATENT DOCUMENTS

2013/0176398 A1* 7/2013 Bonner ................. G09F 15/00
345/173
2024/0354542 A1 10/2024 Wang et al.

FOREIGN PATENT DOCUMENTS

AU    2021455235 A1    2/2024
CN    202018667 U    10/2011
(Continued)

OTHER PUBLICATIONS

International Search Report issued for counterpart Chinese Patent Application No. PCT/CN2021/104451 mailed on Apr. 8, 2022 (3 pages).

(Continued)

*Primary Examiner* — Matthew Mikels
(74) *Attorney, Agent, or Firm* — Nutter McClennen & Fish LLP (57) ABSTRACT

The present disclosure provides an electronic shelf label, including a rear shell (1), a screen (4), a protective sheath (5) and a lens (6). The protective sheath (5) is sheathed on an outer side of the screen (4), an accommodation groove (101) is formed on the rear shell (1), and the screen (4) is disposed in the accommodation groove (101). The lens (6) is disposed to cover a groove opening of the accommodation groove (101) and is connected to an edge of the rear shell (1). A portion of the protective sheath (5) located at an edge of a display port of the screen (4) is supported between the lens (6) and the screen (4), so that a press-resistant gap (8) is reserved between the lens (6) and the screen (4). The present (Continued)

disclosure solves the technical problems that the electronic shelf label is easy to be damaged and the use effect is poor.

13 Claims, 6 Drawing Sheets

(51) Int. Cl.
  *G09F 3/20* (2006.01)
  *H01M 10/052* (2010.01)
  *H01M 50/105* (2021.01)
  *H01M 50/119* (2021.01)
  *H01M 50/121* (2021.01)

(52) U.S. Cl.
  CPC ........... *G09F 3/208* (2013.01); *H01M 10/052* (2013.01); *H01M 50/105* (2021.01); *H01M 50/119* (2021.01); *H01M 50/121* (2021.01)

(58) Field of Classification Search
  CPC ... G09F 3/208; H01M 10/052; H01M 50/105; H01M 50/119; H01M 50/121
  See application file for complete search history.

(56) References Cited

FOREIGN PATENT DOCUMENTS

| CN | 105226300 A | 1/2016 |
|---|---|---|
| CN | 206020895 U | 3/2017 |
| CN | 106886806 A | 6/2017 |
| CN | 207148440 U | 3/2018 |
| CN | 207174433 U | 4/2018 |
| CN | 209543762 U | 10/2019 |
| CN | 209821872 U | 12/2019 |
| CN | 209928845 U | 1/2020 |
| CN | 210295773 U | 4/2020 |
| CN | 211264344 U | 8/2020 |
| CN | 211264345 U | 8/2020 |
| EP | 4369248 A1 | 5/2024 |
| JP | 2012181454 A | 9/2012 |
| KR | 20200014033 A | 2/2020 |
| WO | 2021077368 A1 | 4/2021 |
| WO | 2023279229 A1 | 1/2023 |

OTHER PUBLICATIONS

Australian First Office Action issued on Oct. 24, 2024 for counterpart Australian patent application No. 2021455235 (3 pages).
Extended European Search Report issued on Mar. 21, 2025 for counterpart European patent application No. 21948728.7 (11 pages).
First Office Action and search report issued on Feb. 28, 2025 for counterpart Canadian patent application No. 3224165 (8 pages).
First Office Action issued on May 7, 2025 for counterpart Mexico patent application No. MX/u/2024/000010, along with the English translation (9 pages).
First Office Action and search report issued on Jul. 24, 2025 for counterpart Chinese patent application No. 202110755878.6 (15 pages).
First Office Action issued on Jul. 30, 2025 for New Zealand Patent application No. 807366 (3 pages).

\* cited by examiner

ELECTRONIC SHELF LABEL

CROSS-REFERENCE TO RELATED APPLICATIONS

The present application is a National Stage of International Application No. PCT/CN2021/104451, filed Jul. 5, 2021, which is hereby incorporated by reference in its entirety.

TECHNICAL FIELD

The present disclosure relates to the field of electronic products, further to an electronic shelf label, and particularly to an electronic shelf label with low cost, high reliability, long service life and modularity.

BACKGROUND

The electronic shelf label has been widely used as an electronic label for displaying product price information.

As the electronic shelf label is required to meet different installation scenarios, there are frequent demands for customized sizes of the electronic shelf label, and the installation and use environment of the electronic shelf label poses great challenges to the reliability of the electronic shelf label. In the installation process of the electronic shelf labels, due to the centralized mass installation, it is often encountered that all the shelf labels are piled together and frequently transported, and during use the shelf labels are often hit by shopping carts, etc. Therefore, certain requirements are put forward for both the anti-collision capability and the dropping performance of the electronic shelf label. In addition, in order to improve the stability and efficiency of the installation of the electronic shelf label, workers often directly press the screen with their fingers in the installation process of the electronic shelf label, so certain requirements are also put forward for the static pressure resistance of the electronic shelf label. After the unified installation of a large number of electronic shelf labels, a high maintenance cost is required due to the short battery life.

Although there are many types of existing electronic shelf labels and various enterprises are constantly introducing new electronic shelf label, the FPC circuit of the screen in the existing electronic shelf label still needs to be connected to a connector socket, which is costly, and the size of the circuit board is limited due to too many electronic components. Moreover, the screen of the electronic shelf label has no protective structure and is easy to be damaged. In addition, a power supply used in the electronic shelf label is a button battery, which is limited by the self-discharge rate, resulting in unsatisfactory use effect.

SUMMARY

An objective of the present disclosure is to provide an electronic shelf label, in which a screen is sheathed by a protective sheath to buffer external forces in all directions, and a press-resistant gap is reserved between a lens and the screen to effectively avoid the screen from being damaged by being pressed.

Another objective of the present disclosure is to provide an electronic shelf label, in which a battery and a circuit board are stably connected, the battery has a longer service life, thereby reducing maintenance cost and being suitable for long-term use.

The present disclosure can be realized by the following technical solutions.

The present disclosure provides an electronic shelf label, including a rear shell, a screen, a protective sheath and a lens. The protective sheath is sheathed on an outer side of the screen, t an accommodation groove is formed on the rear shell, and the screen is disposed in the accommodation groove. The lens is disposed to cover a groove opening of the accommodation groove and is connected to an edge of the rear shell, and a portion of the protective sheath located at an edge of a display port of the screen is supported between the lens and the screen, so that a press-resistant gap is reserved between the lens and the screen.

The present disclosure has the following advantageous effects:

The electronic shelf label can protect the six end faces of the screen through the protective sheath. When subjected to an external force from any direction, the protective sheath deforms itself for buffering and damping, thereby protecting the screen. Since the press-resistant gap is reserved between the lens and the screen, even if the lens is subjected to an external pressing force, the lens will be deformed in the press-resistant gap, and will not be directly pressed to the screen, so as to effectively prevent the screen from being damaged by being pressed, and protect the screen, thereby improving the anti-impact and anti-pressing capabilities of the electronic shelf label and prolonging the service life thereof. Since being capable of matching with the rear shell of various sizes, the circuit board is of high versatility and suitable for modular production, thereby achieving the purposes of rapid stocking, mass production and processing cost reduction. The circuit board and the battery may be fixed to each other through various connection modes, which facilitates the installation and achieves high stability. The power source adopts a lithium-manganese pouch battery, which not only occupies a small space, but also has advantages of good safety and high cost performance, and has better performance indexes compared with the button battery. Since the lithium-manganese pouch battery is adopted, the thickness is greatly reduced, and the electronic shelf label of the present disclosure can meet the size requirement of ultra-thin appearance under the condition of equivalent electric quantity.

BRIEF DESCRIPTION OF THE DRAWINGS

The following drawings are only intended to schematically illustrate and explain the present disclosure, rather than limiting the scope of the present disclosure. In the drawings.

DESCRIPTION OF EMBODIMENTS

For a clearer understanding of the technical features, objectives, and effects of the present disclosure, specific embodiments of the present disclosure will now be described with reference to the drawings.

Figure 1:
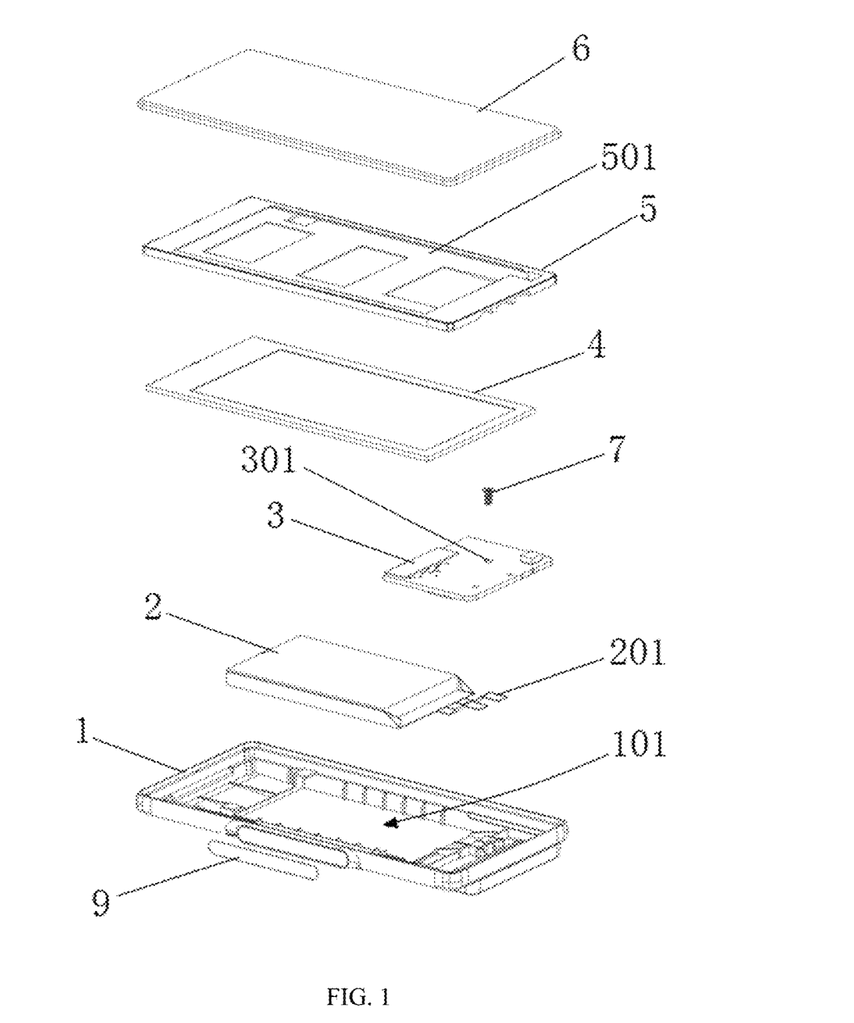
FIG. 1 illustrates a schematic diagram of a decomposition state of an electronic shelf label of the present disclosure.
Figure 2:
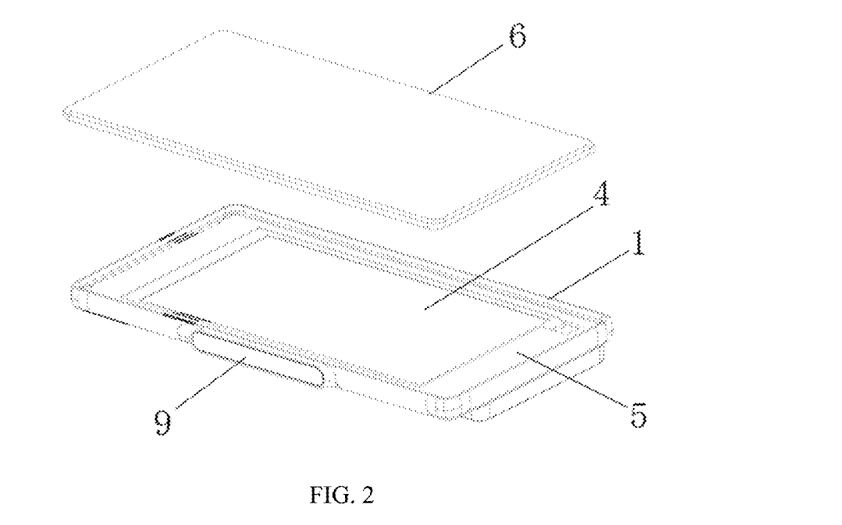
FIG. 2 illustrates a structural schematic diagram of an electronic shelf label of the present disclosure in which a screen is installed in a rear shell.
Figure 3:
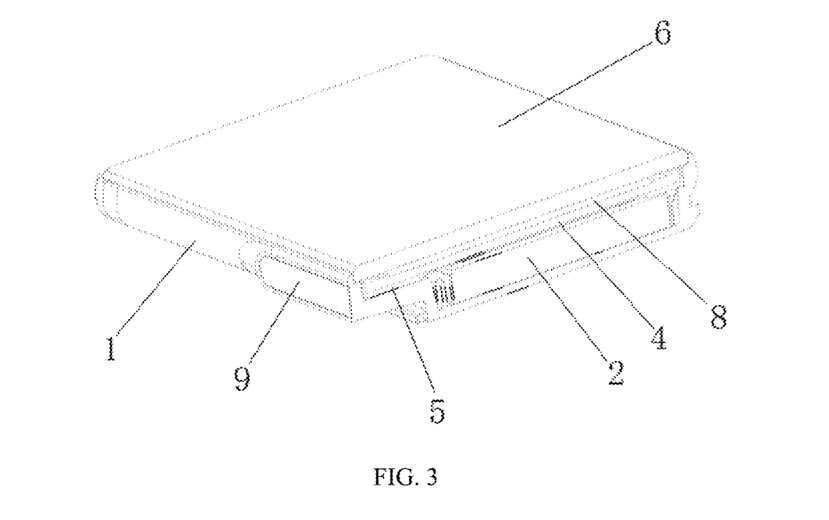
FIG. 3 illustrates a cross-sectional view of an electronic shelf label of the present disclosure.

As illustrated in FIGS. 1 to 3, the present disclosure provides an electronic shelf label, including a rear shell 1, a screen 4, a protective sheath 5 and a lens 6. The protective sheath 5 is fixedly sheathed on an outer side of the screen 4. An accommodation groove 101 is formed on the rear shell 1, and both the screen 4 and the protective sheath 5 are fixedly disposed in the accommodation groove 101. The lens 6 is disposed to cover a groove opening of the accommodation groove 101 and is connected to an edge of the rear shell 1. A portion of the protective sheath 5 located at an edge of a display port of the screen 4 is supported between the lens 6 and the screen 4, so that a press-resistant gap 8 is reserved between the lens 6 and the screen 4.

In the present disclosure, the screen 4 is sheathed by the protective sheath 5 capable of protecting the entire screen 4 (i.e., the six end faces of the screen). When the screen 4 is subjected to an external force from any direction, the protective sheath 5 deforms itself for buffering and damping, thereby protecting the screen. In addition, since the press-resistant gap 8 is reserved between the lens 6 and the screen 4, even if the lens 6 is subjected to an external pressing force, the lens 6 will be deformed in the press-resistant gap 8, and will not be directly pressed to the screen 4, so as to effectively prevent the screen 4 from being damaged by being pressed, and protect the screen 4, thereby improving the anti-impact and anti-pressing capabilities of the electronic shelf label and prolonging the service life thereof.

Further, the protective sheath 5 may be made of, but not limited to, an elastic silicone material.

Further, a display opening 501 is provided on the protective sheath 5 at a position opposite to the display port of the screen 4, and the lens 6 is made of a transparent material, so that the screen 4 can display commodity information to the outside through the display opening 501 and the lens 6 in turn.

In the present disclosure, as illustrated in FIGS. 1 and 3 to 5, the electronic shelf label further includes a battery 2 and a circuit board 3, both of which are fixedly disposed in the accommodation groove 101, and the circuit board 3 is connected to the rear shell 1, so that a tab 201 of the battery 2 is tightly pressed against a power source end of the circuit board 3.

Figure 4:
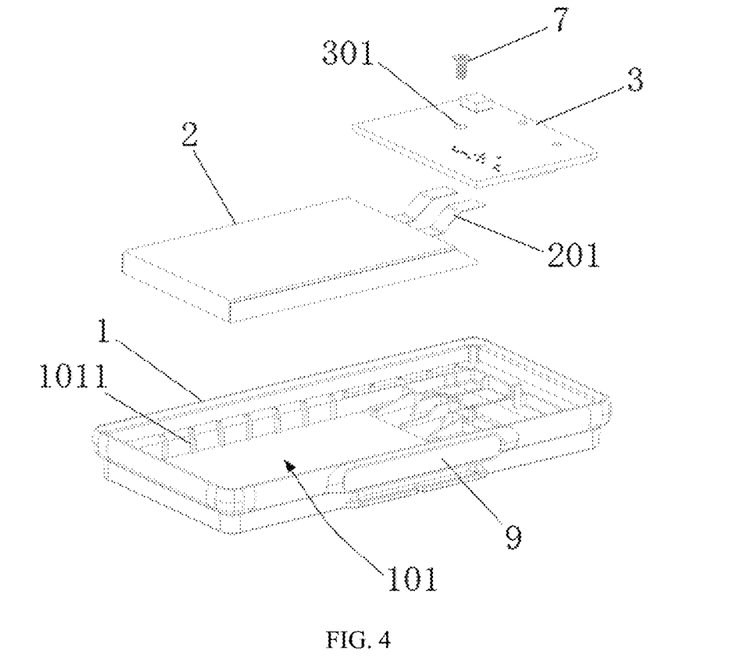
FIG. 4 illustrates a first schematic diagram of a connection mode between a circuit board and a battery in an electronic shelf label of the present disclosure.

In an alternative embodiment of the present disclosure, as illustrated in FIGS. 1 and 4, a fixing hole 301 is provided on the circuit board 3, a screw 7 is disposed in the fixing hole 301, and the circuit board 3 is fixedly connected to the rear shell 1 through the screw 7, so that the tab 201 of the battery 2 is tightly pressed against the power source end of the circuit board 3, thereby ensuring the stability of the power supply.

Figure 5:
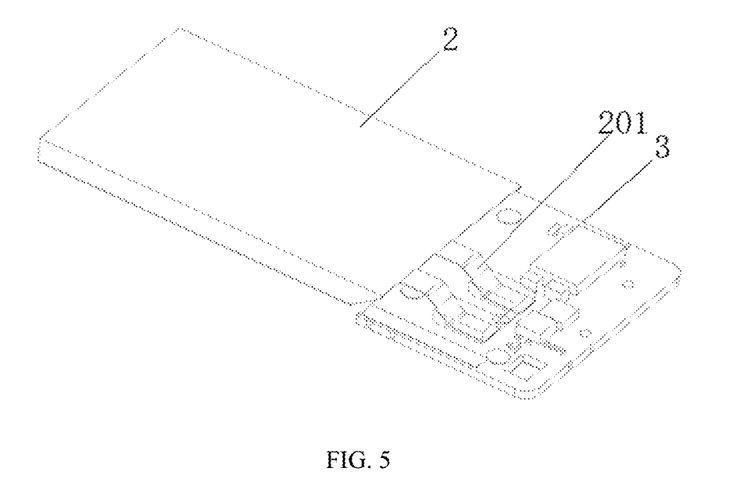
FIG. 5 illustrates a second schematic diagram of a connection mode between a circuit board and a battery in an electronic shelf label of the present disclosure.

In another alternative embodiment of the present disclosure, as illustrated in FIG. 5, the tab 201 of the battery 2 is welded with the power source end of the circuit board 3, so that the tab 201 of the battery 2 and the power source end of the circuit board 3 maintain a fixed connection relationship, thereby ensuring the stability of the power supply.

Further, the battery 2 is wrapped by an aluminum-plastic film housing.

Further, the battery 2 is a lithium-manganese pouch battery, which can greatly enhance the following application performance indexes in addition to ensuring the advantages of good safety and high cost performance:
1. customizable shape: the shape of the battery can be customized according to an installation space to meet the needs of products;
2. equivalent self-discharge rate: the annual average self-discharge rate of the battery is less than 1% during the long-term use of the electronic shelf label;
3. good storage performance: the storage life of the battery is more than ten years;
4. wide temperature performance: the battery is applicable to a temperature range of −25° C. to 60° C., and the battery in a temperature of 0° C. can still output an electric quantity of about 95% of a normal temperature capacity;
5. current load capacity: the constant current output capacity of the battery is more than 100 mhA, which is more than 10 times that of CR2450 battery (i.e., button-type lithium-manganese dioxide battery).

In an alternative embodiment of the present disclosure, as illustrated in FIG. 4, a plurality of clamping pieces 1011 are disposed side by side at intervals on an inner wall of the accommodation groove 101, the battery 2 is disposed in a middle position between the clamping pieces 1011, and the edge of the battery 2 is clamping-fit to each of the clamping pieces 1011, which not only facilitates the assembly and disassembly, but also ensures the stable installation of the battery 2 in the rear shell 1.

Figure 6:
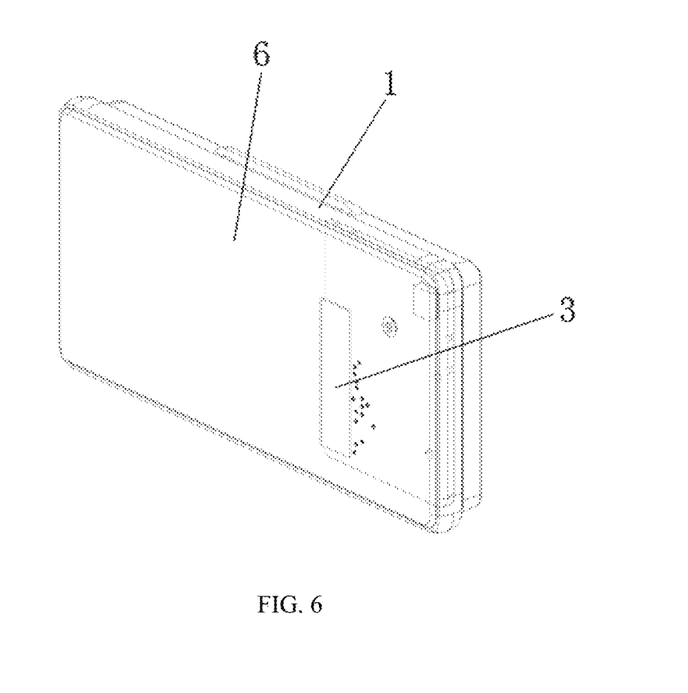
FIG. 6 illustrates a first schematic diagram of an installation position of a circuit board in an electronic shelf label of the present disclosure.
Figure 7:
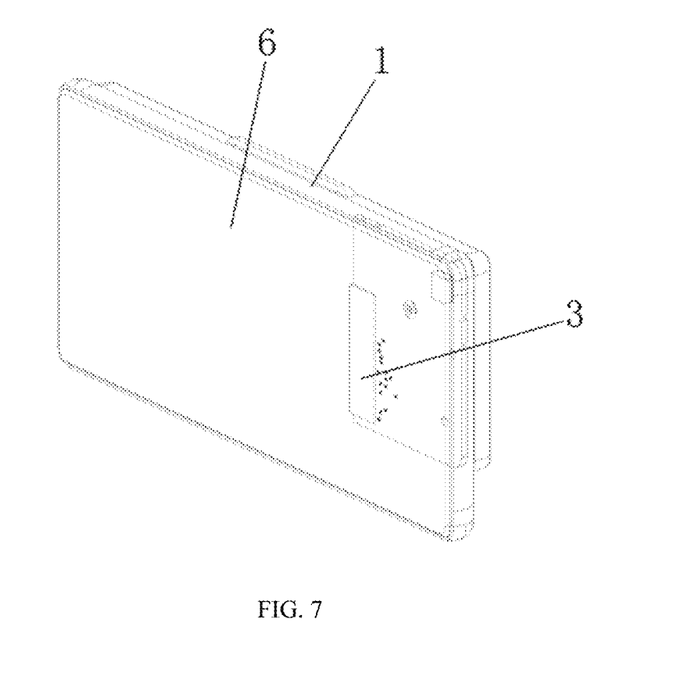
FIG. 7 illustrates a second schematic diagram of an installation position of a circuit board in an electronic shelf label of the present disclosure.
Figure 8:
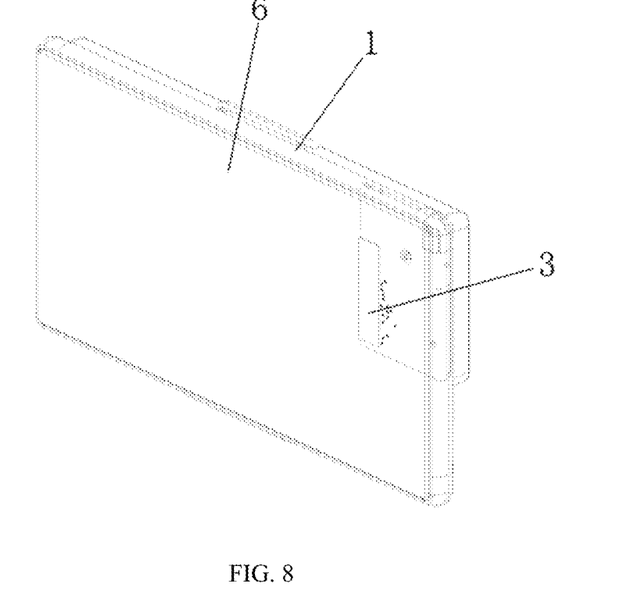
FIG. 8 illustrates a third schematic diagram of an installation position of a circuit board in an electronic shelf label of the present disclosure.

In an alternative embodiment of the present disclosure, as illustrated in FIGS. 6 to 8, the circuit board 3 and the rear shell 1 are both rectangular structures, and the circuit board 3 may be installed at a top corner in the rear shell 1, so that the shape of the circuit board 3 can be matched with the rear shell 1 of various sizes, which makes the circuit board 3 highly versatile and suitable for modular production, thereby achieving the purposes of rapid stocking, mass production and processing cost reduction.

In the prior art, the purpose of fixing and protecting the screen is achieved by fixedly connecting the circuit board with the screen. However, since the shape of the circuit board 3 in the present disclosure is suitable for modular production, the area of the circuit board 3 in the present disclosure should be much smaller than that in the prior art, so the circuit board 3 cannot fix and protect the screen 4 in the present disclosure. In order to prevent the screen 4 from being damaged, the protective sheath 5 is provided in the present disclosure to achieve the purpose of protecting the screen 4.

Figure 9:
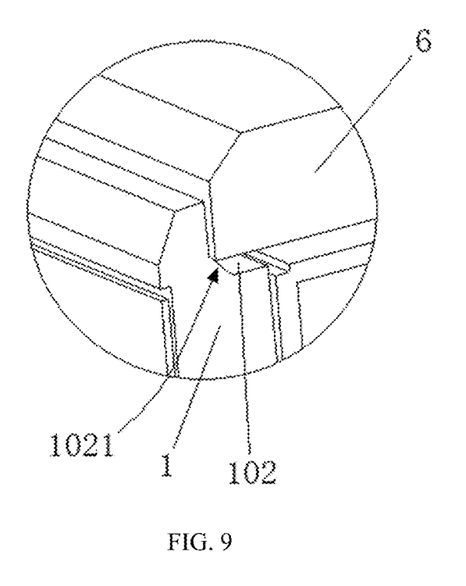
FIG. 9 illustrates a first partial enlarged view of a connection position between a lens and a rear shell in an electronic shelf label of the present disclosure.
Figure 10:
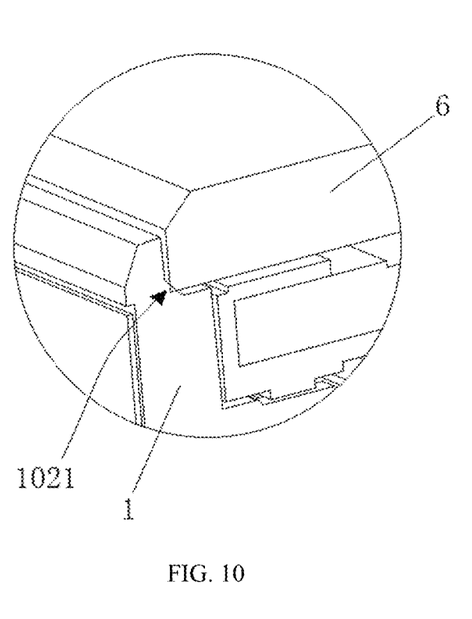
FIG. 10 illustrates a second partial enlarged view of a connection position between a lens and a rear shell in an electronic shelf label of the present disclosure.

In an alternative embodiment of the present disclosure, the lens 6 and the rear shell 1 may be connected by ultrasonic welding. As illustrated in FIGS. 9 and 10, a welding groove 102 is disposed along the edge of the rear shell 1, an inclined surface 1021 is formed on an inner wall of the welding groove 102 in an extension direction of the welding groove 102, and an edge of the lens 6, with a right-angled cross section, is located in the welding groove 102 and ultrasonically welded with the inner wall of the welding groove 102, so that the rear shell 1 and the lens 6 are integrally formed. In the installation process of the lens 6, as illustrated in FIG. 9, the lens 6 is placed in the welding groove 102 until the edge of the lens 6 abuts against the inclined surface 1021, and ultrasonic welding is carried out between the lens 6 and the inner wall of the welding groove 102 while continuing to press the lens 6. In the welding process, a squeezing force is generated between the inclined surface 1021 and the edge of the lens 6, so that the inclined surface 1021 is melt to fill the remaining gap between the lens 6 and the welding groove 102, and the edge of the lens 6 fits the welding groove 102, thereby achieving a stable connection between the lens 6 and the rear shell 1. Of course, any other structure may be disposed in the welding groove 102, as long as the structure can make the edge of the lens 6 not fit the inner wall of the welding groove 102 before the lens 6 is connected to the rear shell 1, i.e., the structure can make the cross section of the welding groove 102 not right-angled before the lens 6 is connected to the rear shell 1, so as to ensure that the inner wall of the welding groove 102 can fit the edge of the lens 6 by ultrasonic welding.

In another alternative embodiment of the present disclosure, the lens 6 and the rear shell 1 may be connected by spot gluing. The welding groove 102 is disposed along the edge of the rear shell 1, and the welding groove 102 and the edge of the lens 6 both have right-angled cross sections, so that the edge of the lens 6 does not fit the inner wall of the welding groove 102. The edge of the lens 6 is placed in the welding groove 102 and connected to the inner wall of the welding groove 102 by spot gluing.

In an alternative embodiment of the present disclosure, as illustrated in FIGS. 1 to 4, the edge of the rear shell 1 is provided with a sticker 9 for labeling a barcode, through which the electronic shelf label is bound with a commodity, so as to ensure that the information of the electronic shelf label is consistent with the information of the commodity.

Those described above are merely illustrative of specific embodiments of the present disclosure, and are not intended to limit the scope of the present disclosure. Any equivalent variation and modification made by a person skilled in the art without departing from the concept and principle of the present disclosure should fall within the scope of the present disclosure.

What is claimed is:
1. An electronic shelf label, comprising:
a rear shell;
a screen;
a protective sheath; and
a lens,
wherein the protective sheath is sheathed on an outer side of the screen, an accommodation groove is formed on the rear shell, and the screen is disposed in the accommodation groove,
wherein the lens is disposed to cover a groove opening of the accommodation groove and is connected to an edge of the rear shell,
wherein a portion of the protective sheath located at an edge of a display port of the screen is supported between the lens and the screen so that a press-resistant gap is reserved between the lens and the screen,
wherein the electronic shelf label further comprises a battery and a circuit board, both of which are disposed in the accommodation groove, and the circuit board is connected to the rear shell so that a tab of the battery is tightly pressed against a power source end of the circuit board, and
wherein a fixing hole is provided on the circuit board and a screw connected to the rear shell is disposed in the fixing hole.

2. The electronic shelf label according to claim 1, wherein a display opening is provided on the protective sheath at a position opposite to the display port of the screen.

3. The electronic shelf label according to claim 1, wherein the tab of the battery is welded to the power source end of the circuit board.

4. The electronic shelf label according to claim 1, wherein the battery is wrapped by an aluminum-plastic film housing.

5. The electronic shelf label according to claim 4, wherein the battery is a lithium-manganese pouch battery.

6. The electronic shelf label according to claim 1, wherein a plurality of clamping pieces are disposed on an inner wall of the accommodation groove and the battery is clamping-fit to each of the clamping pieces.

7. The electronic shelf label according to claim 1, wherein a shape of the circuit board is matched with the rear shell of various sizes.

8. The electronic shelf label according to claim 1, wherein a welding groove is disposed along the edge of the rear shell, an inclined surface is formed on an inner wall of the welding groove in an extension direction thereof, and an edge of the lens is located in the welding groove and ultrasonically welded with the inner wall of the welding groove so that the rear shell and the lens are integrally formed.

9. The electronic shelf label according to claim 8, wherein the edge of the lens abuts against the inclined surface.

10. The electronic shelf label according to claim 8, wherein the edge of the lens abuts against the inclined surface so that a gap is formed between the lens and the welding groove, and the inclined surface is melted during a welding process to fill the gap between the lens and the welding groove.

11. The electronic shelf label according to claim 1, wherein a welding groove is disposed along the edge of the rear shell, an inclined surface is formed on an inner wall of the welding groove in an extension direction thereof, and an edge of the lens is located in the welding groove and welded with the inner wall of the welding groove so that the rear shell and the lens are integrally formed.

12. The electronic shelf label according to claim 11, wherein the edge of the lens abuts against the inclined surface.

13. The electronic shelf label according to claim 11, wherein the edge of the lens abuts against the inclined surface so that a gap is formed between the lens and the welding groove, and the inclined surface is melted during a welding process to fill the gap between the lens and the welding groove.

* * * * *